United States Patent [19]

Betensky et al.

[11] Patent Number: 4,757,372
[45] Date of Patent: Jul. 12, 1988

[54] SLR ZOOM CAMERA

[75] Inventors: Ellis I. Betensky, Redding, Conn.; Melvyn H. Kreitzer; Jacob Moskovich, both of Cincinnati, Ohio

[73] Assignee: Eastman Kodak Company, Rochester, N.Y.

[21] Appl. No.: 107,139

[22] Filed: Oct. 9, 1987

[51] Int. Cl.⁴ .............................................. G03B 13/08
[52] U.S. Cl. ................................ 354/201; 354/195.12; 350/429
[58] Field of Search ............... 354/199, 200, 201, 402, 354/406, 195.12; 350/429, 427

[56] References Cited

U.S. PATENT DOCUMENTS

| | | | |
|---|---|---|---|
| 3,273,457 | 9/1966 | Macher et al. | 350/427 |
| 3,972,056 | 7/1976 | Tsujimoto et al. | 354/402 |
| 4,000,501 | 12/1976 | Sakaguchi et al. | 350/409 |
| 4,037,238 | 7/1977 | Leitz et al. | 350/429 |
| 4,114,171 | 9/1978 | Altman | 350/429 |
| 4,185,191 | 1/1980 | Stauffer | 354/407 |
| 4,506,970 | 3/1985 | Fujibayashi et al. | 354/406 |
| 4,529,286 | 7/1985 | Fujii | 354/402 |
| 4,609,944 | 9/1986 | Nakada et al. | 354/402 |
| 4,694,151 | 9/1987 | Yoshimura | 354/402 |

FOREIGN PATENT DOCUMENTS 62-66219 3/1987 Japan .
62-66218 3/1987 Japan .

*Primary Examiner*—A. A. Mathews
*Attorney, Agent, or Firm*—Dennis P. Monteith

[57] ABSTRACT

A compact SLR camera embodies a zoom taking lens and a diagonal reflecting member along the axis of the taking lens that diverts the optical ray path coming through the lens element forwardly thereof to a viewing screen. The reflecting member is movable along the axis of the taking lens in coordination with the corresponding zooming movement of an adjacent lens element so that the reflecting member and the lens element occupy the same location during different stages of zooming; thereby eliminating the long back focus dictated by the fixed location of the reflecting member in conventional SLR cameras.

10 Claims, 3 Drawing Sheets

SLR ZOOM CAMERA

BACKGROUND OF THE INVENTION

1. Field Of The Invention

The present invention relates to single lens reflex (SLR) cameras and more particularly to means for improving the compactness of SLR cameras with zoom lenses.

2. Description Relative To The Prior Art

Single lens reflex (SLR) cameras have obvious advantages as compared to other types of conventional cameras, the most important advantage being the ability to view the object precisely as it will be imaged on the film, regardless of the lens focal length or the object distance. This is accomplished by placing a viewfinder mirror in the ray path of the taking lens close to the film plane to allow the object to be imaged by the objective lens on a focusing screen that is viewed through the optical system of the viewfinder. The mirror may be removed from the taking lens ray path during the film exposure, but always assumes the same position during viewfinding.

Almost all SLR cameras are designed to accept interchangeable lenses, the most versatile of which is a so-called macro-zoom lens, which provides for a continuous range of different focal lengths and for focusing on objects from infinity to relatively close to the camera. For example a 35 mm camera equipped with a macro-zoom lens with a focal length range of 30-105 mm (i.e. a 3½ to 1 zoom ratio) and the ability to focus objects as close as 0.5 mm to the camera (i.e. macro focus) could be considered as representative of a general purpose camera that would meet all of the requirements of most amateur photographers. However, because of optical design considerations related to the location of the mirror, which dictates a long back-focal length, a zoom, and particularly a macro-zoom lens is necessarily quite large, both in length and also in the diameter of the frontal optical elements. Also, the mirror requires that the rearward element of the relatively long lens be at a considerable distance from the film plane, which further increases the overall length of the camera. Furthermore, a conventional SLR camera is necessarily quite large in its vertical dimension because of the location of the viewfinder penta prism above the film path. Consequently, a SLR camera with such a lens feature is entirely too large to be acceptable for general purpose amateur use without the expensive and inconvenient option of interchangeable conventional lenses to allow it to be made more compact.

SUMMARY OF THE INVENTION

The present invention overcomes the foregoing disadvantages of SLR zoom and macro-zoom cameras, to provide a general purpose SLR camera with an integral zoom or macro-zoom lens, such camera being substantially more compact and less expensive than a conventional SLR camera with corresponding optical versatility.

In accordance with the invention this improvement is achieved by replacing the conventional viewfinder mirror with a mirror that is located between two movable optical units of the zoom lens. This mirror likewise may be removed from the ray path of the taking lens during film exposure, but both the mirror and its support means are also movable along the axis of the lens as the adjacent lens elements are moved to effect zooming. By allowing the mirror and a lens element to occupy the same location during different stages of zooming adjustment, this innovation eliminates the problems arising from the long back focus dictated by a viewfinder mirror at a fixed location adjacent the film plane, allows much greater freedom in the overall lens design and makes it possible to achieve a small forward to rearward dimension of the camera while meeting the previously recited objectives.

During the viewing operation, the movable mirror diverts the rays which have travelled part way through the taking lens, to a viewing screen on which an image of the object or scene is focused by a screen focusing lens between the mirror and the screen. The viewing screen, in turn, is viewed through eyepiece optics of the viewfinder system. Because the mirror need not be located closely adjacent the film plane, the viewfinder can be located conveniently in lateral relation to the objective lens, rather than above it as is required in almost all conventional SLR cameras. Accordingly, the invention also allows for significant reduction in the camera's vertical dimension.

Because the mirror is moved during zooming, the distance from the mirror to other elements of the viewfinder system is not constant. Consequently, means are necessary to compensate for this variable path length.

One way to satisfy this requirement is to relay the ray path between the mirror and a fixed focusing screen through another variable conjugate lens system, the focal length of which varies as a function of the position of the zoom adjustment of the taking lens, thereby maintaining an image of proper size in focus on the viewing screen, which is viewed by an eyepiece. Obviously, either the screen focusing lens system or the eyepiece must erect the image for proper viewing.

In another system, the screen focusing lens elements between the mirror and the screen correspond to the lens elements rearwardly of the mirror in the taking lens. The focusing screen is movable so that the image thereon corresponds in size and focus precision to that which will be imaged on the film. As used herein, the term focus precision means that the image perceived by the eye and the image on the film will have the same relative sharpness, both in and out of focus. By providing a diagonal mirror movable with the screen, the distance between the screen and the erecting viewfinder eyepiece can be maintained constant so that the fixed lenses can be used in the viewfinder optical system.

To make the camera still more compact, the screen focusing lens preceding the focusing screen can be different from its counterpart in the zoom lens itself so that the focal length of the lens system that creates an image on the screen is shorter than that of the system that creates an image on the film plane. This also allows for an increased aperture and an increase in apparent viewing brightness in the viewfinder system. Because the focal length of the zoom lens is thus reduced, the size of the focusing screen can likewise be reduced. However, the length of the optical path from the eyepiece to the screen varies as a function of the zoom adjustment of the taking lens and the zoom range of the viewfinder image is less than the zoom range of the photographed image, which dictates that the image size at the focusing screen does not necessarily correspond to the image size at the film plane. This image size difference and the variation in the length of the viewfinder optical path is therefore compensated by changing the focal length of the optical system through which the screen is viewed as a function of the zoom setting of the objective lens, thus retoring both image size and focus precision correlation between the viewed scene and the scene that will be imaged on the film.

Other advantages and novel features of the invention will be apparent from the following description of illustrative embodiments, reference being made to the accompanying drawings wherein:

DESCRIPTION OF THE ILLUSTRATIVE PREFERRED EMBODIMENT

Because SLR cameras and zoom lenses are well known, the present description will be directed in particular to those elements forming part of the present invention and it will be understood that camera elements not specifically shown or described may take various forms well known to those of ordinary skill in the art.

Figure 1:
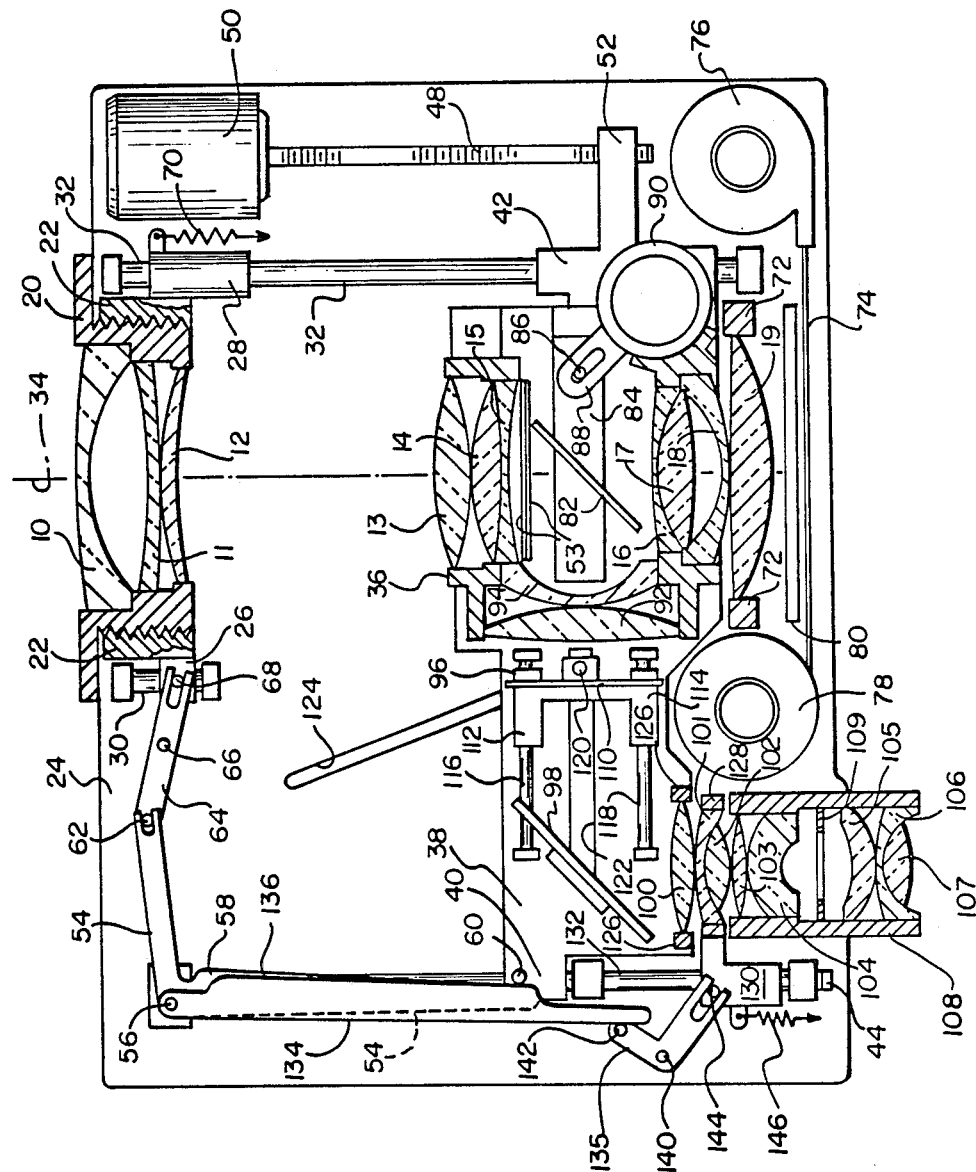
FIG. 1 is a somewhat schematic plan view of a camera mechanism incorporating an optical system according to a preferred embodiment of the invention, depicting the mechanism in the condition in which an object can be viewed through the viewfinder with the zoom taking lens adjusted to its shortest focal length.
Figure 2:
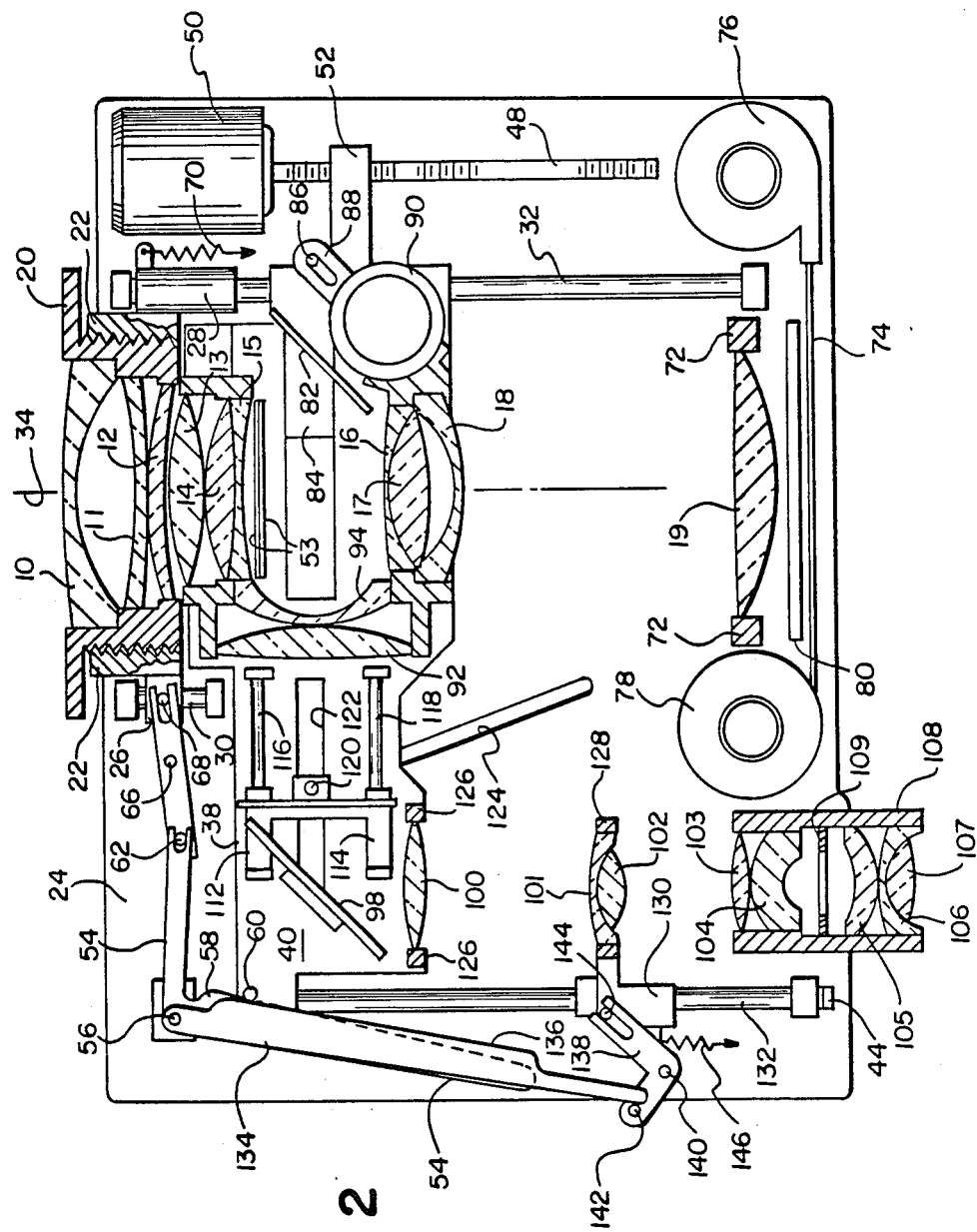
FIG. 2 corresponds to FIG. 1 but depicts the mechanism in condition for making an exposure with the zoom taking lens adjusted to its longest focal length.

In the embodiment of the invention shown in FIGS. 1 and 2, the taking lens is a ten-element zoom lens in which lens elements 10, 11 and 12 comprise a focusable front element unit, elements 13 through 18 comprise a movable intermediate element unit and element 19 is of a fixed rearward element. Specific details of such a taking lens are the subject of commonly assigned copending U.S. patent application Ser. No. 107,223 filed on even date herewith in the name of Melvyn H. Kreitzer and Ellis I. Betensky and entitled Zoom Lens; the disclosure of which is secifically incorporated herein by reference.

The front element unit is mounted in a mounting ring 20 threaded into a support member 22 so that rotation of the ring relative to the support member provides focusing adjustment of the front element unit. The support member 22, in turn, is mounted to a base plate 24 by means of bushings 26 and 28 slidable along respective support rods 30 and 32, whereby, for zooming purposes, the front lens unit, including the support member 22, can be moved axially along the axis of the taking lens depicted by line 34.

The elements comprising the intermediate unit are mounted in a support member 36 carried by a movable plate 38 slidably supported by bushings 40 and 42 on respective guide rods 44 and 32 mounted to base plate 24. A threaded shaft 48 of reversible motor 50 is threaded through an ear 52 of plate support bushing 42 so that the intermediate lens element unit carried by plate 38 can be adjusted by motor 50 between the short focal length and long focal length conditions shown respectively in FIGS. 1 and 2. The intermediate element unit also includes an adjustable diaphragm or stop represented by two overlapping vertically movable blades 53, which are adjusted by conventional means, not shown, movable with support member 36. To correlate the zooming adjustment of the front lens element unit with the corresponding movement of the intermediate lens element unit, a lever 54, pivotally mounted to the base plate by pin 56 on the forward support element of guide rod 44, is provided with an inner cam face 58 that bears against pin 60 on movable plate 38. When plate 38 moves from the position shown in FIG. 1 to the position shown in FIG. 2, pin 60 displaces lever 54 in a clockwise direction. A pin 62 on lever 54 is received in the corresponding forked end of intermediate lever 64, pivoted to the base plate by pin 66, and the opposite forked end of the intermediate lever receives pin 68 on bushing 26 of support member 22. Consequently, the forward movement of movable plate 38 and the intermediate lens unit carried thereby causes the front lens unit to be moved forwardly, against the opposition of a light spring 70, which maintains cam face 58 in contact with pin 60 and eliminates slack from the lever system. Although not readily apparent from the drawings, it should be obvious that cam surface 58 can be profiled to coordinate the movement of the front lens unit properly with that of the intermediate unit notwithstanding non-linearity in the linkage system or the optical system.

The rearward lens element 19 is supported to the base plate, by support means 72, in a fixed position adjacent the film plane, which is represented by film 74 extending between film supply cassette 76 and film take-up spool 78. The heavier portion of the line representing the film designates the width of the image area in the film plane. As in most SLR cameras, a focal plane shutter is located adjacent the film plane as depicted at numeral 80.

A diagonal mirror 82 is located between the lens elements 15 and 16 of the intermediate element unit and is supported by a dovetail slide bar 84. A pin 86 on bar 84 is received in slotted arm 88 of a rotary solenoid 90, carried by movable plate 38, to move the mirror between its viewing position, shown in FIG. 1 and its exposure position, shown in FIG. 2. Alternatively, the mirror could be moved pivotally between the viewing and exposure positions or in certain types of cameras, a beam splitter could be employed, which would move along the axis of the taking lens but which would not be movable between a viewing position and an exposure position.

When the mirror is in the film exposure position, light entering the viewfinder eyepiece will be reflected toward the taking lens, but not toward the film. During the momentary opening of the focal plane shutter, the eyepiece is not exposed to direct light because of the proximity of the photographer's eye and there is little likelihood of the film being damaged. Nevertheless, it may be desirable to provide means for positively preventing light from entering the camera through the eyepiece while the film is being exposed. As is well known in conventional SLR cameras, this can be accomplished by causing the mirror to block the raypath between the eyepiece and the taking lens when the mirror is in exposure position. Alternatively, a supplemental shutter can be provided in the viewfinder system to accomplish the same purpose. If the camera is provided with a conventional shutter forwardly of the mirror, rather than with a focal plane shutter, it is essential to provide some such means for preventing light from the eyepiece from reaching the film because the film is at all times vulnerable to light within the camera. In other words, in such a camera, the mirror structure or a supplemental shutter system should be employed to prevent light entering the eyepiece from reaching the film regardless of whether the mirror is in the viewfinding position or the eyepiece position.

In addition to mirror 82, the optical components of the viewfinder system include a two-element screen imaging lens unit comprising lens elements 92 and 94, a focusing screen 96, a diagonal mirror 98, fixed to movable plate 38, and an erecting eyepiece system including a movable single element 100, a movable two-element unit comprising elements 101 and 102 and a fixed five-element unit comprising elements 103 through 107, which are supported by support member 108. A rectangular field stop 109 is provided in the eyepiece between lens elements 104 and 105, in the plane of the aerial image of the viewing screen created by the viewfinder optical system.

The screen focusing lens unit, is carried by support member 36 with its axis perpendicular to that of the taking lens and the focusing screen 96. The focusing screen is analogous to the type of screen used in conventional SLR cameras and is supported by a support element 110 provided with bushings 112 and 114 slidable along respective guide rods 116 and 118 mounted to movable plate 38, so that the focusing screen can move along the axis of the screen focusing lens unit. A framing mask, not shown, on the face of the focusing screen, defines the rectangular boundary of the image focused on the screen. A pin 120, depending from support element 110, extends through a slot 122 in movable plate 38 and is received in a slot 124 in base plate 24. Accordingly, as the movable plate moves during zooming, slot 124 causes the position of the focusing screen to be adjusted so that the image formed on the screen will be of the same focus precision as the image that will be focused in the film plane during film exposure.

It should be noted that the camera can be provided with autofocusing means, if desired, in which case the viewing screen can also comprise an element of the autofocus system.

In conventional SLR cameras, the image formed on the focusing screen is of the same size as that formed in the film plane, but, in this embodiment, the image focusing screen is smaller than the image in the film exposure plane in the interest of compactness. In other words, the screen focusing element unit comprising lens elements 92 and 94 has a shorter focal length than does the combination of elements 17 through 19, which results in the overall focal length of the elements preceding the focusing screen being shorter than the focal length of those elements preceding the film plane. For example, the illustrated taking lens has a focal length in its short focal length (FIG. 1) of approximately 29.3 mm and a focal length of approximately 116 mm in its long focal length (FIG. 2), but the focal length of the lens system preceding the focusing screen is approximately 26.5 mm in the short focal length and approximately 55.9 mm in the long focal length. Consequently, the length of the optical path between the eyepiece and the focusing screen does not remain constant during zooming, and, not only is the image area on the focusing screen smaller than that at the film plane, but the zoom ratio is also different, i.e. the focusing screen image of a given object does not change as much in size between the extreme zoom adjustments as does the film plane image. Accordingly, the viewfinder optical system that views the focusing screen by means of mirror 98 on movable plate 38 must also be a variable conjugate system adapted to compensate for this variable path length and for the zoom ratio discrepancy.

It should be noted that if the screen focusing lens element unit corresponds to the lens elements between mirror 82 and the film plane, so that the image size on the focusing screen is the same as that in the film plane, the focusing screen moves at a 45° angle relative to the taking lens axis during zooming and the length of the optical path between the focusing screen and the eyepiece, via mirror 98, will be constant, in which case the optical system employed to view the focusing screen need not be a variable conjugate system.

In the eyepiece optical system, lens element 100 is carried by mounting means 126 on movable plate 38 in fixed relation to mirror 98. The lens element unit comprising lenses 101 and 102, however, is carried by mounting member 128, which is slidably supported by bushing 130 on guide rod 132 and by a similar bushing, which is not shown, but which is directly below bushing 139 on guide rod 44. A cam lever 134, above the previously mentioned lever 54, is supported by pin 56 and is provided with a cam surface 136 engaged with pin 60 on movable plate 38. When the movable plate is moved from the position shown in FIG. 1 to the position shown in FIG. 2, pin 60 causes lever 134 to rotate slightly in a clockwise direction. Intermediate lever 138 is pivoted to the base plate by pin 140 and carries a pin 142 engaged with the corresponding end of lever 134 so that pivotal movement of the latter rotates the intermediate lever in the opposite direction. The other end of the intermediate lever is forked to receive pin 144 of mounting member 128, which is biased rearwardly by spring 146. Accordingly, the profile of cam surface 136 of lever 134 causes the lens element unit comprising elements 101, 102 and 103 to be adjusted to effect the required conjugate change in correlation with the zooming adjustment of the taking lens and the attendant movement of the focusing screen.

Figure 3:
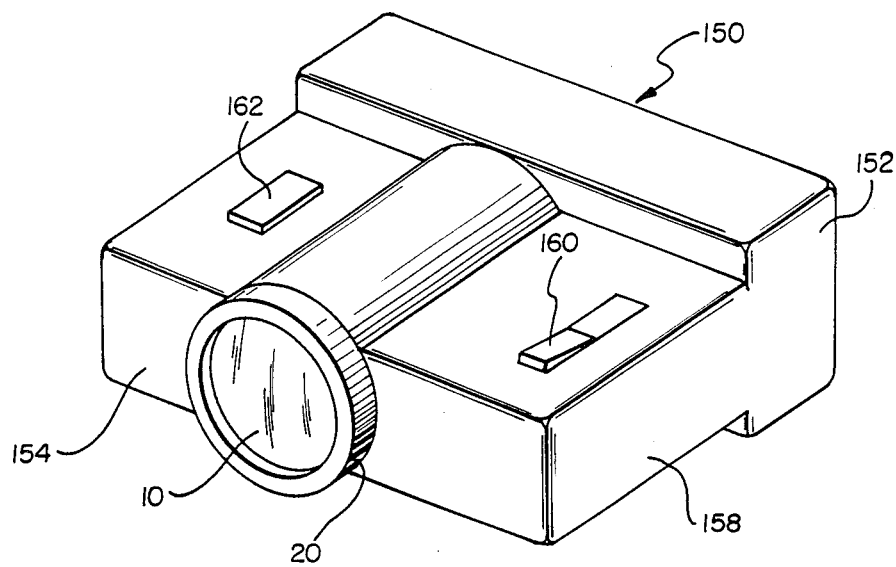
FIG. 3 is a perspective front view of a camera incorporating internal components of the type depicted in FIGS. 1 and 2.
Figure 4:
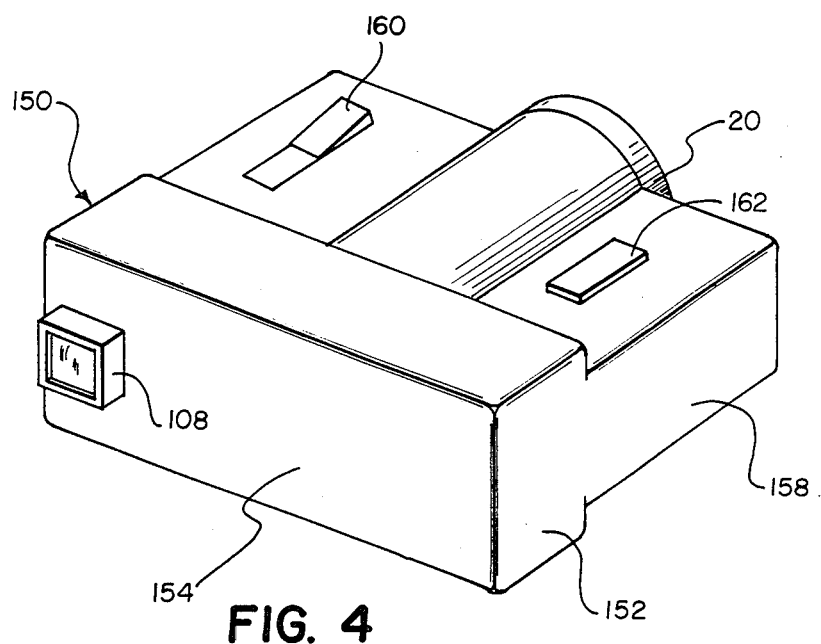
FIG. 4 is a rear perspective view of the camera shown in FIG. 3.

The illustrative camera 150 depicted in FIGS. 3 and 4 illustrates the relative compactness provided by the invention by allowing the forward to rearward dimension of the overall camera to be only slightly greater than the length of the taking lens itself, and the greatest vertical dimension of the camera to be dictated by the diameter of the taking lens system or the space required to accommodate the height of the film cassette in the rearward portion 152 of the camera housing 154. The side to side dimension is dictated by the location of the film cassette and the film take up spool and of the eyepiece support member 108, which is located beside the take up spool as shown in FIGS. 1 and 2. Although FIGS. 1 and 2 show various mechanical components between the eyepiece and the corresponding end of support plate 24, this is obviously a somewhat schematic illustration of components that need not actually occupy that location.

Although the illustrative camera seen in FIGS. 3 and 4 depicts the forward portion 158 of the camera housing as having a flat box-like configuration with a zoom control rocker switch 160 and a shutter release button 162 in its top surface, it should also be apparent that an almost unlimited number of overall camera configurations are compatible with the invention. For example, although the eyepiece is shown in the same horizontal plane as the axis of the taking lens, the optical path between the taking lens and the eyepiece could be sloped upwardly or downwardly to allow the eyepiece to be located above or below its illustrated position, and even above or below the film path, if desired.

The invention has been described with particular reference to illustrative embodiments thereof, but it will be understood that variations and modifications can be effected within the spirit and scope of the invention.

We claim:

1. A zoom camera comprising:
   means defining a film plane;
   a zoom taking lens having an optical axis and including a movable lens element movable along said optical axis to effect zooming adjustment of an image created at said film plane by said taking lens during a film exposure operation;
   a focusing screen;
   reflecting means positionable across said optical axis during a viewfinding operation for diverting light in the optical raypath coming through said taking lens forwardly of said reflecting means to said focusing screen;
   support means for movably supporting said reflecting means for movement along said optical axis;
   means coordinating the movement of said reflecting means and said movable lens element whereby said reflecting means and said lens element occupy the same location along said optical axis during different stages of zooming adjustment; and
   screen focusing means for providing at said focusing screen during viewfinding an image of the same focus precision as that of the image which the same zoom adjustment creates at said film plane during a film exposure operation.

2. The invention defined by claim 1 including screen support means supporting said focusing screen for movement parallel to the optical axis of said taking lens and aligned with said reflecting means.

3. The invention defined by claim 2 including screen focusing lens means between said reflecting member and said focusing screen.

4. The invention defined by claim 2 in which said focusing means includes means for moving said focusing screen laterally with respect to the axis of said taking lens to vary the distance between said focusing screen and said reflecting member.

5. The invention defined by claim 3 in which said taking lens includes rearward lens means between said reflecting member and said film plane.

6. The invention defined by claim 5 in which said focusing lens means has a focal length shorter than that of said rearward lens means, whereby the image produced on said focusing screen is smaller than the corresponding image produced in the film plane with the same zoom lens adjustment.

7. The invention defined by claim 1 including viewfinder optical means for viewing said focusing screen.

8. The invention defined by claim 7 in whcih said viewfinder optical means includes means for erecting the image on said focusing screen so that it is viewed upright through said optical means.

9. The invention defined by claim 8 including an eyepiece comprising said erecting means.

10. The invention defined by claim 7 in which said viewfinder optical means comprises a variable conjugate lens system adjustable in accordance with the zoom adjustment of said taking lens.

* * * * *